Dec. 14, 1954    D. E. CROOKER    2,696,864
DIRECTIONAL TRACTION DEVICE
Filed Feb. 12, 1952
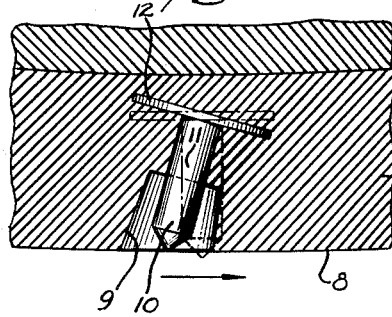
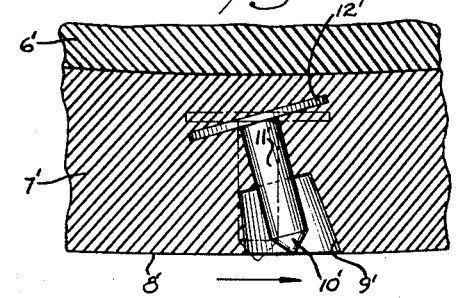
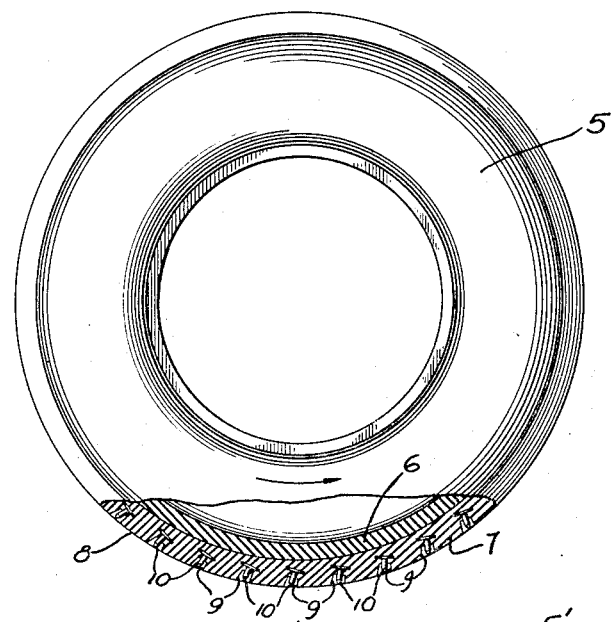
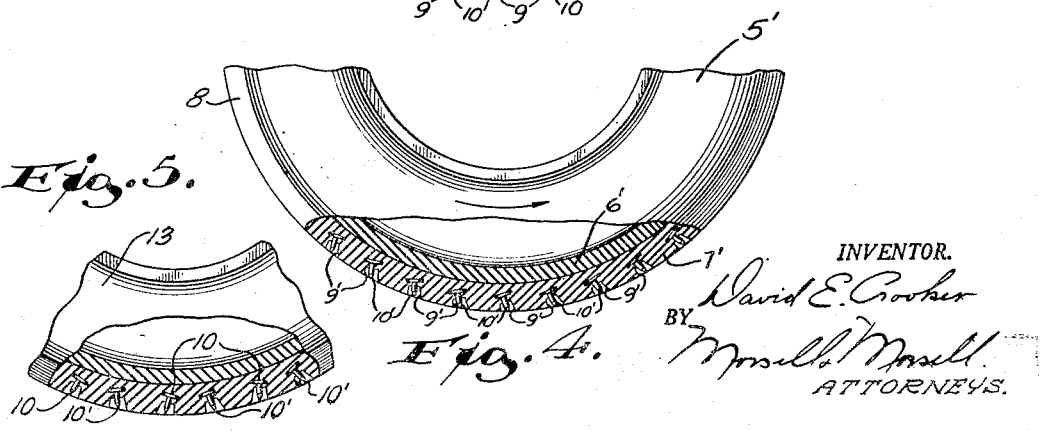
INVENTOR.
David E. Crooker
BY
ATTORNEYS.

United States Patent Office 2,696,864
Patented Dec. 14, 1954

2,696,864

DIRECTIONAL TRACTION DEVICE

David E. Crooker, Ontonagon, Mich., assignor of one-half to Lloyd L. Felker, Marshfield, Wis.

Application February 12, 1952, Serial No. 271,253

2 Claims. (Cl. 152—211)

This invention relates to improvements in directional traction devices, and more particularly, though not exclusively, to vehicle tires having directionally acting traction augmenting means.

My copending application for patent, Serial No. 180,659, filed August 21, 1950, and now abandoned, discloses a traction device in the form of a vehicle tire having flat-headed metallic caulks or studs embedded in the tread thereof and projecting radially outwardly in a direction normal to the tread surface, the outer end of each stud being disposed within a recess in the tread surface. While tires made in accordance with this disclosure have proven relatively satisfactory, nevertheless, during use forces are exerted on the studs to cause them to angle to a position where they are less effective than originally intended.

In addition, there are certain applications where it is very desirable to have a traction augmenting device which is especially effective to prevent slippage in a particular direction. For example, on certain heavy equipment such as road graders, it is especially desirable to provide additional traction for the drive wheels during forward movement under load, whereas in this type of equipment stopping presents no problem from a slippage standpoint. In other applications, on the other hand there is a definite need for traction devices having traction characteristics which are particularly effective to prevent slippage in the opposite direction. An example of the latter application is airplane tires. It is desirable for airplane tires to have traction characteristics which prevent slippage of the tires of an airplane which is in the process of landing at the instant said tires contact the ground, thereby causing more immediate rotation of the airplane wheels to minimize tread scuffing and wear. These same traction characteristics are also effective to prevent slippage of the tires when the brakes are applied. Airplane tires require this traction augmenting action in only one direction, since this type of tire is never rotated in a reverse direction.

With the above in mind, it is one object of the present invention to provide an improved traction augmenting device which is particularly effective to prevent slippage in one direction over a road surface.

Another object of the invention is to provide an improved traction device having traction augmenting studs embedded therein at an oblique angle of inclination in a circumferential direction with respect to the road engaging surface.

A more specific object of the invention is to provide a traction device of the class described wherein the outer end of each inclined stud is disposed within a separate recess in the tread surface, said recesses providing spaces within which the studs are free to move to a traction augmenting position normal to the tread surface, in which position the tips of the studs project outwardly beyond the plane of said tread surface.

Another specific object of the invention is to provide an improved non-skid tire construction which is applicable either to new tires or to retreading operations.

A further object of the invention is to provide an improved traction device of the class described which is strong and durable, relatively inexpensive to manufacture, and which is otherwise well adapted for the purposes described.

With the above and other objects in view, the invention consists of the improved traction device, and all of its parts and combinations, as set forth in the claims, and all equivalents thereof.

In the drawing accompanying and forming a part of this specification, wherein is shown one complete embodiment of the preferred form of the invention, and wherein like characters of reference indicate the same parts in all of the views:

Fig. 1 is an enlarged fragmentary sectional view of a portion of a vehicle tire constructed in accordance with the invention;

Fig. 2 is an enlarged fragmentary sectional view similar to Fig. 1 taken through another tire constructed in accordance with the invention;

Fig. 3 is a side elevational view of the tire of Fig. 1, parts being broken away and shown in section;

Fig. 4 is a fragmentary side elevational view of the tire of Fig. 2, parts being broken away; and Fig. 5 is a fragmentary side elevational view of a tire, parts being broken away and shown in section, showing the use of studs which are alternately angled in a circumferential direction first in one oblique direction, and then in an opposite oblique direction with relation to the road surface. This type of construction is particularly suitable for use on the rear wheel tires of a passenger car or truck.

The illustrated embodiment of the improved traction device takes the form of a vehicle tire 5 (Fig. 3) having a carcass 6 and having a rubber tread portion overlying the periphery of the carcass 6, said tread portion having a road engaging peripheral surface 8. The tread portion 7 is formed with a plurality of spaced cup-shaped recesses 9 extending inwardly from the surface 8. The axes of the cup-shaped recesses 9 preferably extend in planes parallel to the plane of rotation of the tire and are preferably inclined, as shown in Figs. 1 and 3, to form an oblique angle in a circumferential direction with respect to the adjacent portions of the surface 8. In the form of the invention illustrated in Figs. 1 and 3 the axes of the recesses 9 in the same tire are all inclined in the same direction relative to the surface 8.

A plurality of traction augmenting studs 10, each having a straight shank portion 11 and having a flat head portion 12 of relatively large diameter are embedded in the rubber tread portion 7. Each of the studs 10 has its head larger than and spaced below the bottom of one of the cup-shaped recesses 9, and has its shank 11 projecting coaxially into said recess.

The outer end of each stud 10 preferably extends to the plane of the road engaging surface 8. The shanks 11 of the studs 10 are coaxial with the recesses 9, and each stud extends in a plane parallel to the plane of rotation of the tire when the portion of the tire in which it is located is in contact with the ground and flattened by the weight of the vehicle and is inclined at an oblique angle in a circumferential direction.

The tire shown in Figs. 1 and 3 is particularly well adapted for use on airplane landing wheels. When an airplane is coming in for a landing it is essential that the wheels begin to rotate as soon as possible after the tires touch the ground. It is also essential that the landing wheel tires have excellent traction characteristics for braking purposes. When the tire of Figs. 1 and 3 is used on airplanes, said tire is installed so that it will rotate in the direction indicated by arrows in Figs. 1 and 3 when the airplane travels forwardly along the ground. Superior traction characteristics are not necessary to forward travel of the plane along the ground, since the plane is pulled forwardly by the propeller.

When a plane equipped with the improved tires comes in for a landing, contact of the tires with the ground pulls the studs 10 rearwardly to the dot and dash line position shown in Fig. 1. In this position the tips of the studs 10 are projected outwardly beyond the surface 8 to greatly increase the traction between said tire and the ground and thereby cause immediate rotation of the landing wheels. Once the intertia of the wheels has been overcome so that the wheels are rolling freely there is no longer any substantial tendency for the wheels to slip over the ground. Therefore, the studs 10 will then return to their normal retracted position shown in Figs. 1 and 3. However, when the brakes of the landing wheels are applied, the studs 10 are again pulled rearwardly to the upright dot and dash line position of Fig. 1 to project the tips of said studs beyond the surface 8 and provide additional traction. Thus, the plane is brought to a quick stop.

Referring to Figs. 2 and 4, a tire 5' is shown which is constructed similarly to the tire 5, and the portions thereof to which primed numerals are applied are identical with corresponding portions indicated by the same numerals unprimed in Figs. 1 and 3. In the tire 5', however, it will be noted that the recesses 9' and the studs 10' are inclined in the opposite direction from the recesses 9 and studs 10 of the tire 5.

The tire 5' is well adapted for use on the drive wheels of heavy, relatively slow equipment such as road graders or the like and is installed so that it will rotate in the direction indicated by the arrow in Figs. 2 and 4. When a road grader equipped with tires like the tire 5' travels forwardly under power, the studs 10' are pulled forwardly to the straightened up dot and dash line position of Fig. 2. The tips of the shanks 11' are thereby projected beyond the surface 8' to substantially increase the traction of the drive wheel tires and prevent slippage. Since road graders and the like do not travel at high speeds, and since this type of equipment is usually working under a heavy load which resists forward movement, there is no necessity to provide extra traction to aid in stopping said equipment. Forward movement of the equipment can be stopped relatively quickly by stopping the flow of power to the drive wheels, and sometimes even without any application of the brakes. This is because the load against which the equipment works provides the braking action.

The studs 10 and 10' may be of any desired gauge of metal and may be of various sizes, depending upon the requirements for the particular traction device or tire. In the embodiments shown, the studs 10 and 10' resemble a conventional roofing nail in size and proportion. While the illustrated embodiments show use on tires, it is obvious that the invention has wider application in traction articles. In addition, and considering the tire application, the invention is applicable not only to new tire manufacture, but also to retreading operations.

Referring more particularly to the form of the invention shown in Fig. 5, this type of traction is designed for use in places where both pulling traction and braking efficiency are required. This is particularly true in the case of tires such as the tire 13 used on the rear wheels of a passenger car or truck. In Fig. 5 the studs 10' which preferably comprise about half the studs in the tire are set at one oblique angle in a circumferential direction similar to the angle shown in Fig. 2. The studs 10 which comprise the other half of the studs in the tire are set at an opposite oblique angle similar to the angle of Fig. 1. During normal travel of the vehicle one set of studs is pulled to the erect position to increase forward pulling traction efficiency. On the other hand, when the brakes are applied, the latter set of studs is moved to a less effective position, but the other set of studs is then forced to erect position to increase traction during braking. Thus there is always one set of studs which is effective depending upon particular conditions and requirements. The particular arrangements of the studs is unimportant as long as there is a substantial number angled in one direction and in contact with the road, and also a substantial number angled in the opposite direction and in contact with the road.

Various changes and modifications may be made without departing from the spirit of the invention, and all of such changes are contemplated as may come within the scope of the claims.

What I claim is:

1. In a rubber tire having a tread portion, a plurality of sets of traction augmenting members anchored in said tread portion and each having an outwardly directed straight shank portion, the shank portions of one set of said members being normally inclined at an oblique angle in one circumferential direction, and the shank portions of another set of said members being normally inclined at an oblique angle in the opposite circumferential direction with respect to said tread portion, said traction members being so arranged that there are always some of both sets of members in contact with the road, said shanks having tips which normally project no substantial distance beyond the tread portion and said shanks of one set being responsive to certain forces and the shanks of the other set to other forces, which forces tend to straighten out the shanks to cause the shanks to project beyond said tread portion.

2. In a rubber tire having a rubber tread portion having a tread surface formed with a plurality of recesses, a plurality of sets of headed studs with one stud for each recess, said studs being anchored in said tread portion with their heads spaced below the bottoms of the recesses, and each having an outwardly directed straight shank portion projecting into its recess, the shank portions of one set of said studs being inclined at an oblique angle in one circumferential direction and the shank portions of another set of studs being inclined at an oblique angle in an opposite circumferential direction with respect to said tread surface, the studs being so arranged that there are always studs of both sets in contact with the road, the shanks of said studs having tips which normally project no substantial distance beyond the tread surface, and said shanks being responsive during use to certain forces which tend to straighten them out to cause the tips to project beyond said tread surface.

References Cited in the file of this patent

UNITED STATES PATENTS

| Number | Name | Date |
|---|---|---|
| 2,102,784 | Bridges | Dec. 21, 1937 |
| 2,190,142 | Ansel | Feb. 13, 1940 |
| 2,301,569 | Mucklich | Nov. 10, 1942 |